United States Patent Office 3,502,766
Patented Mar. 24, 1970

3,502,766
PROCESS FOR THE IMPROVEMENT OF POLYAMIDE FILMS
Motohiro Tsuruta and Mutsuo Kuga, Kyoto-shi, and Takeshi Mashimo, Kyoto-fu, Japan, assignors to Nippon Rayon Kubushiki Kaisha, Kyoto-fu, Japan, a corporation of Japan
No Drawing. Continuation-in-part of application Ser. No. 536,481, Jan. 24, 1966. This application June 4, 1968, Ser. No. 734,212
Claims priority, application Japan, Jan. 28, 1965, 40/4,857
Int. Cl. B29d 7/24; B29c 23/00
U.S. Cl. 264—289                                11 Claims

ABSTRACT OF THE DISCLOSURE

This invention relates to a process for improving polyamide films by means of a concurrent biaxial drawing and subsequent shrinking technique whereby very thin polyamide films having high purity and improved properties can be achieved.

RELATED APPLICATION

This application is a continuation-in-part of Ser. No. 536,481 now abandoned, filed Jan. 24, 1966 for the instant inventors.

BACKGROUND OF INVENTION

Films of polyesters, polypropylene, polyvinyl chloride, polyvinylidene chloride, polystyrene, polycarbonates, etc., have previously been prepared by biaxial drawing techniques. However, biaxial drawing techniques have not previously been developed for the drawing of polyamide films on a commercial scale, owing to the various difficult properties of polyamides.

Proposed methods for drawing crystalline resin films (e.g., polyesters and polypropylene) to improve the properties of films in general include the following:

(1) The method disclosed in Japanese patent specification No. 5639/1955 in which the film is first drawn in one direction and then in the transverse direction to form an oriented film. Such a process can be called the "two-step biaxial process," which has been used for example to improve films made of polyesters and polypropylene. However, it has been shown that the two-step biaxial process, employed to improve polyester and polypropylene films, does not usefully improve polyamide films.

Polyamides possess strong hydrogen bonds and low second order transition temperatures so that the work done factor necessary in drawing a polyamide film does not vary much with the draw temperature.

Moreover, polyamides are liable to necking-out when being drawn. Materials like polyamides, which possess strong hydrogen bonds and which are liable to necking-out cannot be usefully drawn by conventional processes. When polyamide films are drawn by any known two-step process, the molecules are first oriented in one direction, and are then oriented in the transverse direction by the second step. Strong hydrogen bonds are formed in the first step, and therefore the second step fails and useful drawn film is not produced.

A further two step process is disclosed in Japanese patent specification No. 2195/1962, in which a certain quantity of a monomer is utilized as plasticizer to improve the behavior of polyamide film in drawing. However, pure polyamide films are preferable to plasticised films, and biaxially oriented films have superior properties to those prepared by other known processes.

(2) In a process which has been employed in particular for drawing polypropylene, the material is drawn in a longitudinal direction by means of two sets of rollers spaced apart in the through-put direction of the material. The material is drawn in a transverse direction by gripping the previously thickened sides of the material in gripping conveyors which move apart.

The material is stretched between the rollers and is simultaneously drawn in the transverse direction. However, this process is not applicable for drawing polyamide films simultaneously and biaxially.

It is important to decrease the distance over which a film is in practice drawn, but it is difficult to decrease this distance when draw rollers are used. Any material like polyamides, which possess strong hydrogen bonds, may be liable to necking-out when drawn by such rollers, and there is the further disadvantage that the films produced have a reduced commercial value. Although such processes can give better results when materials such as polypropylene are drawn to stretch 5–20 fold in both the longitudinal and transverse directions, materials like polyamides, which are apparently not suitable for drawing to such an extent cannot be advantageously drawn simultaneously and biaxially by means of such rollers.

In drawing polyamide films to improve their properties, it is important to avoid unevenness of the film owing to necking-out. Therefore the initial drawing must be very fast so as to be able to give a high degree of stretching to the resulting film.

Polyesters (which are particularly suitable substances for biaxial drawing) can be advantageously drawn at draw temperatures within a certain narrow range above the second order transition temperature. However, when polyamide films are drawn with simultaneous biaxial drawing, it is necessary to maintain a draw temperature considerably higher than the second order transition temperature. In addition, the work done factor for drawing polyamides biaxially and simultaneously does not vary with the draw temperature of the polyamides.

The dimensional stability of films such as polyester films can be improved by treating drawn films by various processes to remove distortion, effect crystallization, etc.; for example:

(1) Drawn film is stretched and is heat-set at elevated temperatures.

(2) Drawn film is subjected to the combined processes of relaxation, heat-setting, heat-shrinking, etc.

In processes of the former type, a film oriented by biaxial drawing is heat-set under tension, whereby the film can be somewhat improved. It is difficult to remove entirely any distortion in the resulting film by the said drawing process, and therefore the film so treated does not achieve sufficient dimensional stability. In an attempt to overcome such disadvantages, a heat-shrinking technique may be used in which the biaxially-drawn film is thermally set to shrink it about 2–10% only in a transverse direction. Thus it may be possible for example to prepare polyester films having low thermal shrinkage. However, such processes do not usefully improve pure polyamide films which have been biaxially drawn, and in particular do not supply adequate dimensional stability.

SUMMARY OF THE INVENTION

We have now discovered that polyamide films must be drawn from the very first with a quicker speed and a larger degree of stretching at a higher temperature, if improved physical properties are to be attained. However, polyamide films produced by the simultaneous and biaxial drawing are liable to have disadvantages such as lower dimensional stability, when such films are used at elevated temperatures, e.g., in hot water.

It is an object of the present invention to provide a process for drawing polyamide films which results in drawn films having substantially improved properties.

According to the present invention we provide a process for drawing a polyamide film in which the film is drawn simultaneously in the longitudinal and transverse directions at a draw speed of from 6,000 to 100,000%/min. and at a temperature within the range of from 70° C. to 180° C. which is at least 35° C. below the melting point of the film, the ratio of the longitudinal and transverse draw speeds being from 2:1 to 0.5:1, and the draw ratio (as herein defined) being from 16:1 to 4:1. Such a drawn film has improved properties, although it is difficult to remove distortions from the resulting film by the above-mentioned heat-setting process, in particular where improved dimensional stability is required. The process according to the invention may if desired be carried out continuously.

When polyamide films oriented by the process of this invention are so treated to improve the dimensional stability by means of the conventional process (for example the relaxation process, which is carried out in only one direction or in two directions separately) they can indeed be shrunk to a limited extent, but the treated films are liable to various disadvantages. For example, deterioration of the most desirable properties produced by the simultaneous biaxial drawing. However, in a preferred embodiment of the present invention, we have found that the dimensional stability can be remarkably improved without deterioration of mechanical properties by using a shrinking step in which the drawn film is shrunk simultaneously and biaxially by 1–10% in both the longitudinal and transverse directions at a rate of shrinking speeds of 0.5:1 to 2.0:1. Such a shrinking step can, if desired, be followed by a heat-setting step carried out at a temperature of from 120° C. up to 10° C. below the melting point of the polyamide. The heat-setting can also be carried out after the drawing step, to improve the film further.

The process according to the invention as hereinbefore defined yields improved polyamide films in one through-put process and in better yield; the polyamide films in general have improved properties such as dimensional stability, tensile strength, and optical clarity. This process is effective probably because the polyamide film is drawn from the very first at a high speed; it is not necessary to add any plasticizer. Although a plasticizer may be added to the polyamide film if desired, such an addtive in general does not give any additional beneficial improvements in properties over those of pure polyamide films.

In one preferred process according to the present invention, the polyamide film after drawing is heated to a temperature from 120° C. to a temperature not higher than 10° C. below the melting point of the film under tension such that the transverse dimension is held substantially constant in order to remove distortion. The heat set film is then preferably subjected to a shrinking step, which is carried out from 120° C. to a temperature 10° C. below the melting point of the film simultaneously and biaxially in both the longitudinal and transverse directions to an extent of 1–10% and at a ratio of shrinking speeds of 0.5:1 to 2:1. The shrunk film is then preferably treated again as hereinbefore described in the heat-setting step.

The single through-put process can be so arranged as to enable one or more of these steps to be effected therein. If desired, one or more steps after the first heat-setting step may be omitted, according to the desired properties of the resulting polyamide film.

In the following specification and claims, the term polyamide films includes in general films made of linear polyamides, for example; poly-a-caproamide, poly-hexamethylene-adipamide, poly-hexamethylene-sebacamide, poly-11-amino-undecanamide, polylaurineamide, copolymerized polyamides, etc., or a mixture of two or more thereof.

It it preferred to use substantially amorphous polyamide films having a crystallinity of not more than 25% measured before treatment according to the present invention, because polyamides having a crystallinity of more than 25% are liable to disadvantages such as breakage in drawing. Crystallinity can be defined as follows:

$$\text{crystallinity} = \left(\frac{da-d}{da-dc}\right) \times \left(\frac{dc}{d}\right) \times 100\%$$

in which $d$ is the density of the film; $dc$ is the density of the crystalline structure; and $da$ is the density of the non-crystalline structure in the film.

The following table gives examples of linear polyamides having a crystallinity of not more than about 25% measured at 25° C.

|  | dc | da | d |
|---|---|---|---|
| Poly-hexamethylene-adipamide | 1.24 | 1.09 | Less than 1.124. |
| Poly-ε-caproamide | 1.212 | 1.113 | Less than 1.135. |
| Poly-11-amino-undecanamide | 1.12 | 1.01 | Less than 1.035. |
| Poly-hexamethylene-sebacamide | 1.157 | 1.041 | Less than 1.067. |

Polyamide films useful in the process of the present invention can in general be prepared by the following processes:

(1) Extrusion of molten polymer (e.g. T-die process, inflation process, etc.)

(2) Processes using solvents (e.g. dry processes, wet processes, etc.)

In the following part of the specification, the polyamide films described are free from additives such as plasticisers.

(I) Draw speed

According to the present invention, polyamide film is drawn simultaneously and biaxially in both the longitudinal and transverse directions. In the specification, the draw speed is defined as follows:

$$\text{Draw speed} = d_1/d_2 \times 100\%/t$$

in which $d_2$ is thickness of the drawn film, $d_1$ is thickness of the film before drawing, and $t$ is the time in minutes necessary to draw the film. According to the present invention, the draw speed of a polyamide film is 6,000–100,000%/min., and especially good results can be obtained at a draw speed ranging from about 10,000–60,000%/min.

A draw speed less than about 6,000%/min. can give rise to necking-out and even breakages. A draw speed more than 100,000%/min. can also give rise to breakages or necking-out.

(II) Ratio of draw speeds

Ratio of draw speeds is defined as follows: ratio of draw speeds=ratio of speed of stretching in a longitudinal direction to that in a transverse direction. The longitudinal and transverse draw speeds used in the calculation are normal or mean values of draw speeds in the longitudinal and transverse directions from the beginning of drawing to any chosen point reached in the drawing process. Draw speeds are measured at the said point. In other words, when a film having a length $l_1$ and width $h_1$ is drawn, the longitudinal draw speed and transverse draw speed can be defined respectively as follows:

$$(l_t/l_1) \times 100\%/t \text{ and } (h_t/h_1) \times 100\%/t$$

where $l_t$ and $h_t$ are respectively the length and width of the drawn film, which are measured after $t$ minutes from the beginning of the drawing at an optional point on the film track.

At any point on the surface of the polyamide film during drawing this ratio must be from 2:1 to 0.5:1.

Any polyamide film drawn at a ratio outside this range is liable to necking-out or breakage. The following Table 1–1 exemplifies the results obtained by simultaneously and biaxially drawing pure poly-ε-caproamide films with a draw speed of 20,000%/min., at 120° C. at different ratios of draw speeds:

TABLE 1-1
[Effects of Ratios of Draw Speeds on Films]

| Test No. | Ratio of draw speeds | Results |
|---|---|---|
| 1 | 2.5:1 | Necking-out observed. Uniform films hardly preparable. |
| 2 | 1.8:1 | Uniform films having a ratio of a thickness of draw film to that of the material before drawing of not more than about 0.08:1 can be drawn. Necking-out scarcely observed. |
| 3 | 1.0:1 | |
| 4 | 0.8:1 | |
| 5 | 0.5:1 | |
| 6 | 0.4:1 | Necking-out and partial breakages observed. |

In the above table, it is shown that films can be with advantage drawn at a ratio of draw speeds from 0.5:1 to 2.0:1.

The following Table 1-2 exemplifies the results obtained from simultaneous biaxial drawing of a copolymerized polyamide, which is prepared by the copolymerization of 85 mol percent of a-caprolactam with 15 mol percent of 11-amino-undecanoic acid; the polyamide films are drawn at a draw temperature of 140° C., draw speed of 2,000%/min. and at the different ratios of draw speeds indicated:

TABLE 1-2
[Effects of Ratios of Draw Speeds on Films]

| Test No. | Ratio of draw speeds | Results |
|---|---|---|
| 7 | 2.5–2.6:1 | Necking-out observed. Non-uniform drawing. |
| 8 | 1.0–1.3:1 | Uniform films obtained having different ratios of thickness of drawn film to thickness of material before drawing of about 0.06:1. Necking-out scarcely observed. |
| 9 | 0.3–0.4:1 | Non-uniform films obtained. |

(III) Draw ratio

Draw ratio is conventionally defined as $l_2h_2/l_1h_1$, in which $l_1$ and $h_1$ are length and width respectively of a film before drawing, and $l_2$ and $h_2$ are length and width respectively of said film after drawing.

In industrial practice of biaxial and simultaneous drawing, however, it is preferred to define the draw ratio as $d_1/d_2$, in which $d_2$ is the thickness of a drawn film and $d_1$ is the thickness of said film before drawing; in this specification, draw ratio is defined as $d_1/d_2$.

According to the present invention, draw ratios from 16:1–4:1 are utilized.

The process of the present invention enables the production of very thin films (2–20, and for example 3, microns in thickness). Such thin films can scarcely be obtained by conventional processes since such a high draw ratio cannot be achieved by conventional processes using films containing plasticizers (e.g., monomers); in such a process, polyamide films can be drawn to a draw ratio of only about 2–3:1 in both the longitudinal and transverse directions. Higher draw ratios can be achieved only by the process according to the present invention.

A ratio higher than about 16:1 can give rise to non-uniformity or partial breakages of the obtained films, while a ratio less than about 4:1 can also give rise to various troubles. In addition, such a low ratio does not yield films having particularly useful properties, and is not therefore useful for drawing polyamides on a commercial scale.

(IV) Draw temperature

The following Table 2-1 shows examples of the results obtained from drawing poly-ε-caproamide films at different draw temperatures at a draw speed of 20,000%/min., and at a ratio of draw speeds of about 1:1.

TABLE 2-1
[Effects of Draw Temperatures on Films]

| Test No. | Draw temperature (° C.) | Results |
|---|---|---|
| 10 | 60 | Films can be drawn only by a small amount. |
| 11 | 80 | Films can be drawn at ratios of thickness of the drawn films to thickness of material before drawing of about 0.08:1 with few necking-out defects. |
| 12 | 120 | |
| 13 | 150 | |
| 14 | 180 | |
| 15 | 200 | Partial breakages and non-uniformity of drawn films observed. |

In Table 2-2, results obtained by drawing poly-11-amino-undecanamide films at a draw speed of 32,000%/min., at a ratio of draw speeds of about 1:1 and at various draw temperatures, are shown:

TABLE 2-2
[Effects of Draw Temperatures on Films]

| Test No. | Draw temperature (° C.) | Results |
|---|---|---|
| 16 | 50 | Drawing impossible. |
| 17 | 70 | Films can be drawn at ratios of thickness of the drawn films to thickness of materials before drawing of about 0.08:1 with few necking-out defects. |
| 18 | 100 | |
| 19 | 120 | |
| 20 | 140 | |
| 21 | 160 | Partial breakages observed. |

According to the present invention, the draw temperature is maintained from 70° C. to a temperature which is not higher than 180° C. and which is at least 35° C. below the melting point of the film. Particularly good results can generally be achieved at about 100–170° C. By drawing at these high temperatures, polyamide films can be advantageously drawn from the very first with larger elongation and with larger draw speeds. Although some polyamide films can be drawn at a draw temperature above 180° C., various disadvantages such as heat deterioration can occur.

Melting points of several polyamides are described on page 34 of "Mechanical Properties of Polymer" by Lawrence E. Nielsen (Reinhold Publishing Corp., New York, N.Y., U.S.A., 1962) as follows:

|  | ° C. |
|---|---|
| Poly-ε-caproamide | 225 |
| Poly-11-amino-undecanamide | 194 |
| Polyhexamethylene adipamide | 265 |
| Polyhexamethylene sebacamide | 227 |

The present invention further provides a series of treatment steps including a heat-setting, heat-shrinkage and further heat-setting, whereby improved properties and in particular good dimensional stability can be obtained.

According to one preferred process of the present invention, a drawn film is heated for about 1 second to 1 minute at about 120° C. to a temperature not higher than 10° C. below the melting point of the film to improve the dimensional stability of the drawn film whereby the crystallization and removal of distortion of polyamide film can be achieved. The period of time for the heat-setting depends upon the thickness of the drawn film, temperature of heat-setting and desired properties of the film, etc. The invention therefore further provides as an optional feature a shrinking step for the removal of distortion of the drawn film which comprises shrinking a drawn film simultaneously and biaxially at a ratio of shrinking speeds of about 0.5:1 to 2.0:1, to an extent of about 1–10%, and from 120° C. to a temperature not higher than 10° C. below the melting point of the film.

The ratio of shrinking can be defined as follows:

$$\text{ratio of shrinking} = \frac{d4 - d3}{d3} \times 100\%$$

in which $d3$ and $d4$ are the thicknesses of a polyamide film before and after shrinking, respectively.

FIGURE 1 is a plan view of one form of film track for practicing the present invention.

The drawing shows a polyamide film 1 (without beaded edges) moving along a film-track B in the direction of arrow A. The film passes through successive heating zones 4, 5, 6, 7, 8, 9 (heated by any suitable heating means, e.g., infra-red radiation, electrical elements) disposed along the film-track B to effect temperature control for preheating, drawing, heat-setting, shrinking, heat-setting, and cooling the film, respectively.

The film is led through the film track B by means of a pair of endless link conveyors 2 having efficient gripping means 3; the driving means for the conveyors are not shown. The conveyors comprise inner and outer plates connected by pivoted zig-zag connecting members 11 so that the conveyors can run on guide rails 10 and 12. The plates adjacent to guide rails 10 are provided on their outsides with efficient gripping means 3 adapted to open at the inlet 13 of the film-track B and grip the edge of the film 1, and open again at the outlet 14 of the film-track B to release the film.

The through-put speed of the film in the various zones 4, 5, 6, 7, 8, 9 depends upon the speed of the corresponding parts of the conveyors 2 in the direction of arrow A (the longitudinal direction) which in turn depends upon the separation of guide rails 10 and 12. In the zones 4, 6, and 8, the transverse dimensions of the film are denoted by $W_1$, $W_2$, and $W_3$ respectively, and the separation of two adjacent gripping means 3 by $P_1$, $P_2$ and $P_3$ respectively.

Stretching in the longitudinal direction equals $P_2:P_1$, and stretching in the transverse direction equals $W_2:W_1$; similarly ratios of shrinking in the longitudinal direction and in the transverse direction are respectively $P_3:P_2$ and $W_3:W_2$.

Stretching and shrinking in the transverse directions are determined by the shape of the film-track as defined by rails 10, whereas stretching and shrinking in the longitudinal direction are determined by the changes in the separation of the inner and outer plates on rails 10 and 12. The separation of the inner and outer plates is denoted by $b_2$, and $b_3$ in zones 4, 6, and 8 respectively (i.e., before drawing, after drawing, and after shrinking). $P_1$, $P_2$ and $W_1$, $W_2$ and $W_3$ are prefreably determined by the following ratios:

$W_2/W_1 = 2$ to $5$
$(W_2 - W_3)/W_2$ less than $0.1$
$(P_2 - P_3)P_2$ less than $0.1$ The draw speeds and their various ratios depend upon the respective conformations of guide rails 10 and 12 and the film-track, and can be changed by adjusting the positions of the guide rails.

The separation of adjacent gripping means 3 is rather critical for good results in simultaneous biaxial drawing; disadvantages caused by concentration of stress are generally best avoided by separating adjacent gripping means by 20 to 35 mm.

The present invention is illustrated by the following examples, in which tensile strength, elongation and transparency to visible light respectively were measured at a temperature of 25° C. and a relative humidity of 60%. The density of the films was measured at 25° C. by means of the gradient tube method using a mixture of ligroin and carbon tetrachloride.

In the following tables, each shrinkage value is a ratio of shrinking per unit area, which was obtained by leaving a film for 1 minute in hot air to give free shrinkage without any tension.

EXAMPLE 1

A substantially amorphous film (density of 1.130 g./cc.; thickness 0.1 mm.; no beaded edges) of poly-$\epsilon$-caproamide (relative viscosity 2.7 when measured at 25° C. in 96% sulphuric acid) was passed at a speed of about 20 m./min. through a preheating zone 2 m. (meters) in length, where the atmosphere was maintained at 150° C. The pre-heated film was drawn simultaneously and biaxially at a ratio of draw speeds of about 1.5:1 with a draw speed of about 32,000%/min. at 130° C. The drawn film was heat-set for 2 seconds at 180° C. under tension such that its dimensions would be kept constant in a transverse direction.

The heat-set film was simultaneously and biaxially shrunk with a ratio of shrinkage speed of about 1.5:1 for 10 seconds at 180° C. to give 4% shrinkage value in both the longitudinal and transverse directions.

The shrunk film was again heat-set for 3 seconds at 190° C. under tension such that the transverse dimension would be kept constant to give a film 0.01 mm. in thickness. The following table shows properties of the resulting film (A) in comparison with those of a substantially amorphous film (B) having a thickness of 0.01 mm. produced by a conventional process from the same raw material as described in this example.

| Properties | (A) | (B) |
| --- | --- | --- |
| Tnesile strength: | | |
| Longitudinal | 1,800 kg./cm.² | 700 kg./cm.² |
| Transverse | 1,100 kg./cm.² | |
| Elongation: | | |
| Longitudinal | 30% | 300% |
| Transverse | 90% | |
| Shrinkage value (at 130°C.) | Less than 2% | |

In the above table and also the tables of following examples, blanks are left in respect of values which have not been determined.

EXAMPLE 2

A substantially amorphous film (density of 1.128/g./cc.; thickness 0.1 mm.) of poly-$\epsilon$-caproamide (which had a relative viscosity of 3.0 when measured at 25° C. in 96% sulphuric acid) was pre-heated in an analogous manner to that described in Example 1 by passing through a pre-heating zone 2 m. in length, where the atmosphere was maintained at 120° C., and then was drawn simultaneously and biaxially at a ratio of draw speeds of about 0.8 with a draw speed of about 32,000%/min. at 130° C. to give a film 0.08 mm. in thickness. The film obtained was treated under the following conditions to provide films having different properties. In the following table, the meanings of the various letter headings are set out below the table.

|   | b | | c | | | d | | e | | | | |
|---|---|---|---|---|---|---|---|---|---|---|---|---|
|   |   |   |   |   |   |   |   | f | | g | | |
| a | Θ | t | Θ | t | SV | SS | Θ | t | L | T | L | T | SV |
| 1 | 180 | 30 | | | | | | | 1,900 | 2,600 | 100 | 25 | 6 |
| 2 | 180 | 2 | 180 | 10 | 4 | 08:1 | 180 | 5 | 1,800 | 2,500 | 100 | 30 | 2 |
| 3 | 180 | 2 | 180 | 5 | 8 | 1:1 | 180 | 2 | 1,900 | 2,500 | 100 | 25 | 1 |
| 4 | 180 | 2 | 180 | 10 | 6 | 1.2:1 | 180 | 2 | 1,700 | 2,600 | 110 | 30 | 2 |
| 5 | 180 | 2 | 180 | 10 | 8 | 3:1 | 180 | 2 | 1,500 | 2,000 | 120 | 60 | 2 | a = Test No.
b = heat-setting under tension.
c = shrinking step.
d = heat-setting under tension.
e = properties of films obtained.
f = Tensile Strength.
g = Elongation.
L = Longitudinal.
T = transverse.
Θ = Temperature (° C.).
t = Time (seconds).
SV = Shrinkage Value (%).
SS = Ratio of shrinking speeds.

The table shows that the prepared film possessed far superior properties to that obtained by Test No. 1 and that a film obtained by a draw-speed ratio of 3:1 (Test No. 5) had poor properties.

EXAMPLE 3

A substantially amorphous film (density of 1.028 g./cc.; thickness of 0.1 mm.;) of poly-11-amino-undecanamide (relative viscosity of 2.7 when measured at 25° C. by a similar manner to that described in Example 1) was preheated in an analogous manner to that described in Example 1 by passing with a speed of 20 m./min. through a pre-heating zone 2 m. in length, where the atmosphere was maintained at 120° C., and was then drawn simultaneously and biaxially for 3 seconds at a ratio of draw speeds of about 0.8:1 to 1.2:1 with a draw speed of about 20,000%/min. at 100° C. to draw a film elongated approximately 3 times in both longitudinal and transverse directions.

The drawn film was passed through a heat-setting zone 10 m. in length, where the atmosphere was maintained at 145° C., with a through-put speed of 60 m./min. under tension such that the transverse dimension would be kept constant and then was treated by cool air to give a film 0.01 mm. in thickness. The following table shows the properties of the resulting film (A) in comparison with those of a substantially amorphous film (B) having a thickness of 0.01 mm. produced by a conventional process from the same raw material as described in this example.

| Properties | (A) | (B) |
|---|---|---|
| Tensile Strength: | | |
| Longitudinal | 2,000 kg./cm.$^2$ | 600 kg./cm.$^2$ |
| Transverse | 2,200 kg./cm.$^2$ | |
| Elongation: | | |
| Longitudinal | 90% | 300% |
| Transverse | 100% | |
| Tear strength: | | |
| Longitudinal | 100 g./10μ | |
| Transverse | 100 g./10μ | |
| Shrinkage value (at 100°C.) | 4% | |
| Transparency to visible light | 90%/10μ | 85%/10μ |

EXAMPLE 4

A substantially amorphous film (0.1 mm. in thickness; no beaded edges) of a copolymerized polyamide obtained by the copolymerization of ε-caprolactam with 15 mol percent of 11-amino-undecanoic acid was preheated in a similar manner to that described in Example 1 with a through-put speed of 15 m./min.

The pre-heated film was simultaneously and biaxially drawn by passing through a drawing zone 2 m. in length at a ratio of draw speeds of about 1:1 to 1.3:1 with a draw speed of about 30,000%/min. at 140° C. to draw a film elongated approximately 3 times in both longitudinal and transverse directions. The drawn film was heat-set by passing through a heat-setting zone 10 m. in length with a through-put speed of 60 m./min. at 180° C. under tension such that the transverse dimension would be kept constant.

The heat-set film was cooled by air and was further cooled by rollers to ambient temperature.

There was obtained an improved film having a thickness of about 0.006 mm., which possessed a soft feel and improved surface properties. In the following table, properties of the resulting film (A) are compared with those of a substantially amorphous film (B) produced by a conventional process from the same raw material as that described in this example.

| Properties | (A) | (B) |
|---|---|---|
| Tensile strength: | | |
| Longitudinal | 650 kg./cm.$^2$ | 150 kg./cm.$^2$ |
| Transverse | 600 kg./cm.$^2$ | |
| Elongation: | | |
| Longitudinal | 30% | 480% |
| Transverse | 20% | |
| Shrinkage value (at 100°C.) | 5% | |

EXAMPLE 5

A substantially amorphous film (0.1 mm. in thickness; density 1.128 g./cc.; no beaded edges) of poly-ε-caproamide (relative viscosity 2.7 when measured by an analogous manner to that described in Example 1) was simultaneously and biaxially drawn in an analogous manner to that described in Example 3 at a draw ratio of about 1:1 and at a draw speed of about 20,000%/min. at 120° C. The drawn film was heat-set for 60 seconds under tension as described in the above-mentioned examples at 180° C. to give a film (A) 0.01 mm. in thickness, the properties of which are compared in the following table with those of a substantially amorphous film (B) produced by a conventional process from the same raw material as that described in this example:

| Properties | (A) | (B) |
|---|---|---|
| Tensile strength: | | |
| Longitudinal | 1,800 kg./cm.$^2$ | 700 kg./cm.$^2$ |
| Transverse | 2,000 kg./cm.$^2$ | |
| Elongation: | | |
| Longitudinal | 60% | 300% |
| Transverse | 30% | |
| Shrinkage value (at 130°C.) | 2% | |
| Transparency to visible light | 90%/10μ | 85%/10μ |

EXAMPLE 6

A substantially amorphous film (0.1 mm. in thickness; density 1.130 g./cc.; no beaded edges) of poly-ε-caproamide was drawn in an analogous manner to that described in Example 1 except that no heat-setting was carried out.

The film was simultaneously and biaxially drawn at 130° C., with a draw speed of about 60,000%/min., and then was treated by air cooling to give an improved film 0.01 mm. in thickness. The following table shows properties of the film obtained:

Tensile strength:
  Longitudinal—1800 kg./cm.$^2$
  Transverse—1100 kg./cm.$^2$
Elongation:
  Longitudinal—30%
  Transverse—90%

EXAMPLE 7

A substantially amorphous film (0.1 mm. in thickness; density 1.128 g./cc.; no beaded edges) of poly-ε-caproamide (relative viscosity 3.0 when measured at 25° C. in 96% sulphuric acid) was simultaneously and biaxially drawn in a similar manner to that described in Example 3 with a draw speed of about 30,000%/min. at 130° C. and was then heat-set for 60 seconds at 180° C. under tension such that dimensions would be kept constant to obtain an improved film.

The following table shows some properties of the film obtained:

Tensile strength:
  Longitudinal—1900 kg./cm.$^2$
  Transverse—2000 kg./cm.$^2$
Elongation:
  Longitudinal—100%
  Transverse—25%
Shrinkage value (at 130° C.)—3%

EXAMPLE 8

A substantially amorphous film (0.1 mm. in thickness; density 1.029 g./cc.;) of poly-11-amino-undecaneamino (relative viscosity 2.7 when measured in a similar manner to that described in Example 1) and made by the T-die process was passed with a through-put speed of 20 m./min. through a pre-heating zone 2 m. in length, where the atmosphere was maintained at 120° C. The pre-heated film was simultaneously and biaxially drawn with a draw speed of about 17,000%/min. at 100° C. by passing through a drawing zone 2.5 m. in length, with a ratio of draw speeds of 0.8 to 1.2:1 in the first 1.75 m. and a ratio of draw speeds of 0.9 to 1.1:1 in the last 0.75 m. respectively, to give an approximately 3 fold elongation in both the longitudinal and transverse directions.

The drawn film was heat-set by passing through a heat-setting zone 2 m. in length, where the atmosphere was maintained at 145° C. by means of hot air, with a through-put speed of 66 m./min. under tension such that the transverse dimension would be kept constant, and was then passed through a shrinking zone 10 m. in length, where the atmosphere was maintained at 145° C. by means of hot air, with a ratio of shrinking speeds of about 1:1 to give a shrinkage value of 6% in both the longitudinal and transverse directions.

Afterwards the shrunk film was cooled by means of cool air to give an improved film 0.01 mm. in thickness.

The following table compares properties of the film (A) of this example with those of another film (B) which was pre-heated and drawn in the same manner as described above except that it was then heat-set for 10 seconds under tension in a similar manner to that described above at 145° C., and with those of yet another film (C) 0.01 mm. in thickness which had a substantially amorphous structure and which was produced by a conventional process from the same raw material as described in this example.

| Properties | (A) | (B) | (C) |
| --- | --- | --- | --- |
| Tensile strength: | | | |
|   Longitudinal | 2,000 kg./cm.$^2$ | 2,000 kg./cm.$^2$ | 600 kg./cm.$^2$ |
|   Transverse | 2,200 kg./cm.$^2$ | 2,000 kg./cm.$^2$ | |
| Elongation: | | | |
|   Longitudinal | 90% | 85% | 300% |
|   Transverse | 100% | 90% | |
| Shrinkage value (at 100° C.) less than | 2% | 4% | |
| Transparency to visible light | 90%/10μ | 90%/10μ | 85%/10μ |

EXAMPLE 9

A substantially amorphous film (0.1 mm. in thickness; density 1.128 g/cc.; no beaded edges) of poly-ε-caproamide (relative viscosity 2.7 when measured at 25° C. in 96% sulphuric acid) was pre-heated by passing through a pre-heating zone 2 m. in length, where the atmosphere was maintained at 140° C., with a through-put speed of 15m./min. The pre-heated film was simultaneously and biaxially drawn for 3 seconds in a drawing zone 1.5 m. in length in an analogous manner to that described in Example 3 with a ratio of draw speeds of about 1:1 and in an atmosphere having a temperature of 120° C. to give an approximately 3 fold elongation in both the longitudinal and transverse directions.

The drawn film was passed through a heat-setting zone 3 m. in length, where the atmosphere was maintained at 180° C. under tension such that the transverse dimension would be kept constant.

The heat-set film was passed through a shrinking zone having a length of about 7.5 m., where the atmosphere was maintained at 190° C. by means of hot air, with a ratio of shrinking speeds of about 1:1 to give a shrinkage value of 3% in both the longitudinal and transverse directions, and then was cooled by means of cool air to give an improved film 0.01 mm. in thickness. The following table shows the properties of the film (A) obtained in this example in comparison with those of a film (B) 0.01 mm. in thickness, which was obtained from the same raw material of this example in a similar manner to that described in this example except that heat-setting was carried out for 10 seconds under tension at 145° C.: and those of a substantially amorphous film (C) 0.01 mm. in thickness produced by a conventional process from the same raw material as described in this example.

| Properties | (A) | (B) | (C) |
| --- | --- | --- | --- |
| Tensile strength: | | | |
|   Longitudinal | 1,800 kg./cm.$^2$ | 1,800 kg./cm.$^2$ | 700 kg./cm.$^2$ |
|   Transverse | 2,000 kg./cm.$^2$ | 2,000 kg./cm.$^2$ | |
| Elongation: | | | |
|   Longitudinal | 60% | 60% | 300% |
|   Transverse | 30% | 30% | |
| Shrinkage value (at 130° C.) less than | 2% | 5% | |
| Transparency to visible light | 90%/10μ | 90%/10μ | 85%/10μ |

According to the present invention, polyamide films can be drawn with a larger elongation to give improved properties to the drawn film, and whereas various additives e.g., plasticizers, can be used, pure polyamide films can be obtained without any additives. However, the properties of pure polyamide films cannot be improved by the use of any additives such as conventional plasticizers. On the contrary, such additives can have a deleterious effect upon the properties of pure polyamide films.

The films obtained according to the present invention can be utilized without any after-treatment or finishing process for example for industrial, packaging, textile, and commercial uses. Films prepared according to the present invention have improved properties such as transparency, mechanical properties such as tensile strength, soft feel, brightness, air and vapor permeability, oil resistance and electrical properties. Furthermore, films prepared according to the present invention possess high dimensional stability.

All films according to the invention obtained by the processes of the various examples were observed to be suitable for various practical purposes including electrical, textile, packaging, and insulating uses.

What we claim is:

1. A process for drawing a polyamide film in which the film is positively drawn simultaneously in the longitudinal and transverse directions at a draw speed of from 6000 to 100,000%/min and at a temperature within the range of from 70° C. to 180° C. which is at least 35° C. below the melting point of the film, the ratio of the longitudinal and transverse draw speeds being from 2:1 to 0.5:1, and the draw ratio being from 16:1 to 4:1.

2. A process according to claim 1 wherein said film is a linear polyamide film.

3. A process according to claim 1 wherein said film is selected from the group consisting of poly-caproamide, poly - hexamethylene - adipamide, poly-hexamethylene-sebacamide, poly-11-amino-undecanamide, polylaurineamide, or a copolymerized polyamide, or a mixture of two or more thereof.

4. A process according to claim 1 wherein said film is drawn with a draw speed of from 10,000 to 60,000%/min.

5. A process according to claim 1 wherein said film has a plasticizer incorporated therein.

6. A process according to claim 1 wherein the drawn film is heat-set at a temperature from 210° C. to a temperature not higher than 10° C. below the melting point of the film while said film is maintained under tension such that the transverse dimension is kept substantially constant.

7. A process according to claim 1 wherein the drawn film is shrunk simultaneously in both the longitudinal and transverse directions at a temperature from 1120° C. up to 10° C. below the melting point of the film by an amount in each direction of from 1 to 10%; the ratio of shrinking speeds in the longitudinal and transverse directions being from 0.5:1 to 2.01:1.

8. A process according to claim 7 wherein the shrunken film heat-set at a temperature of from 10° C. to a temperature not higher than 0° C. below the melting point of the film while said film is maintained under tension to keep the transverse dimension substantially constant.

9. A process according to claim 6 wherein the heat-set film is shrunk simultaneously in both the longitudinal and transverse directions at a temperature from 120° C. up to 10° C. below the melting point of the film by an amount in each direction of from 1 to 10%, the ratio of shrinking speeds in the longitudinal and transverse directions being from 0.5:1 to 2.0:1.

10. A process according to claim 9 wherein the shrunken film is heat-set at a temperature of from 120° C. to a temperature not higher than 10° C. below the melting point of the film while maintaining said film under tension to keep the transverse dimension substantially constant.

11. A process for producing improved polyamide films which comprises:
 (1) positively drawing the film simultaneously in the longitudinal and transverse directions at a draw speed of from 6000 to 100,000% min. and at a temperature within the range of from 70° C. to 180° C. which is at least 35° C. below the melting point of the film, the ratio of the longitudinal and transverse draw speeds being from 2:1 to 0.5:1, and the draw ratio being from 16:1 to 4:1;
 (2) heat setting the drawn film at a temperature from 120° C. to a temperature not higher than 10° C. below the melting point of the film while said film is maintained under tension such that the transverse dimension is kept substantially constant;
 (3) subjecting the heat-setting drawn film to shrinking in both the longitudinal and transverse directions at a temperature from 120° C. up to 10° C. below the melting point of the film by an amount in each direction of from 1 to 10%; the ratio of shrinking speeds in the longitudinal and transverse directions being from 0.5:1 to 2.0:1; and
 (4) then further heat setting the shrunken film at a temperature of from 120° C. to a temperature not higher than 10° C. below the melting point of the film while said film is maintained under tension to keep the transverse dimension substantially constant.

References Cited

UNITED STATES PATENTS 2,618,012   11/1952   Milne _____ 264—289

FOREIGN PATENTS 945,443   12/1963   Great Britain.
954,204   4/1964   Great Britain.
954,420   4/1964   Great Britain.

ROBERT F. WHITE, Primary Examiner

JEFFERY R. THORNTON, Assistant Examiner

U.S. Cl. X.R.

18—1; 260—78; 264—210, 235, 342, 346

UNITED STATES PATENT OFFICE
CERTIFICATE OF CORRECTION

Patent No. 3,502,766   Dated Mar. 24, 1970

Inventor(s) Motohiro Tsuruta et al

It is certified that error appears in the above-identified patent and that said Letters Patent are hereby corrected as shown below:

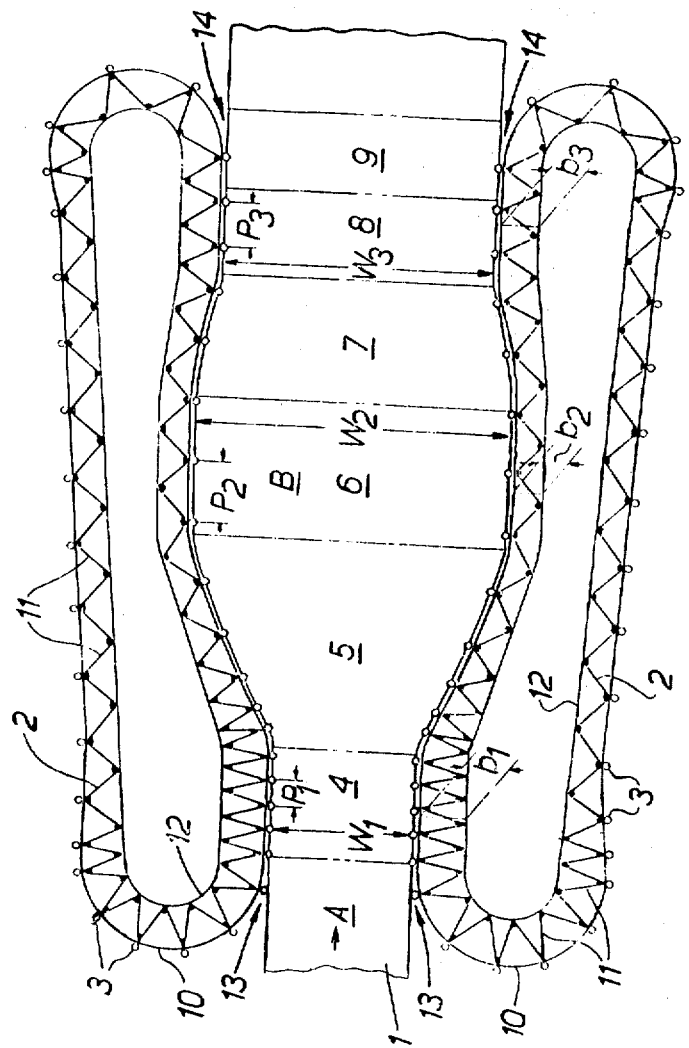

Signed and sealed this 26th day of October 1971.

(SEAL)
Attest:

EDWARD M. FLETCHER, JR.
Attesting Officer

ROBERT GOTTSCHALK
Acting Commissioner of Patents

UNITED STATES PATENT OFFICE
CERTIFICATE OF CORRECTION

Patent No. 3,502,766    Dated  March 24, 1970

Inventor(s) Tsuruta et al

It is certified that error appears in the above-identified patent and that said Letters Patent are hereby corrected as shown below:

Claim 6, line 2 correct "210°C" to --120°C--

Claim 7, line 3 correct "1120°C" to --120°C-- line 7 correct "2.01:1" to --2.0:1--

Claim 8, line 2 correct "10°C" to --120°C-- line 3 correct "0°C" to --10°C--

Signed and sealed this 8th day of May 1973.

(SEAL)
Attest:

EDWARD M. FLETCHER, JR.
Attesting Officer

ROBERT GOTTSCHALK
Commissioner of Patents